(12) United States Patent
Wirz et al.

(10) Patent No.: US 6,368,512 B1
(45) Date of Patent: Apr. 9, 2002

(54) PROCESS FOR THE FILTRATION AND DRYING OF SOLID PARTICLES OUT OF LIQUIDS

(75) Inventors: Walter Wirz, Pfäffikon; Erwin Sennhauser, Winterthur, both of (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/594,020

(22) Filed: Jun. 15, 2000

(30) Foreign Application Priority Data

Aug. 14, 1999 (DE) .......................................... 199 38 663
Apr. 28, 2000 (DE) .......................................... 100 20 974

(51) Int. Cl.[7] .......................... B01D 33/15; B01D 63/16
(52) U.S. Cl. ....................... 210/780; 210/787; 210/791; 210/330; 210/360.1; 34/58; 34/312; 34/318
(58) Field of Search .................................. 210/767, 780, 210/787, 330, 791, 360.1, 380.1; 34/312, 318, 58

(56) References Cited

U.S. PATENT DOCUMENTS 4,975,188 A * 12/1990 Brunsell et al. ......... 210/360.1

FOREIGN PATENT DOCUMENTS

WO          97/13571    *   4/1997

* cited by examiner

*Primary Examiner*—David A. Reifsnyder
(74) *Attorney, Agent, or Firm*—Browdy and Neimark

(57) ABSTRACT

In a housing (1), a hollow shaft (3) is located for rotation, driven by a motor (5). Rigidly attached to the shaft (3) is a pressure vessel (6). Fitted to the shaft (3) inside the vessel (6) is a filter comprising a number of tube-shaped filter elements (9). The liquid to be filtered is fed into an upper chamber (19) of the shaft (3) via an inlet ring (18), and flows through transverse holes (20) into the vessel (6). After passing through the filter (9), the purified liquid is discharged via holes (10) in the hollow shaft (3) through an outlet ring (12). To clean the filter the residual liquid in the vessel (6) is pressed out through the filter with compressed air. Subsequently the deposit adhering to the filter tubes (9) is flung off by rotating the shaft (3) and propelled to the bottom of the vessel by feeding compressed air or clean oil to cleaning nozzles (38). An outlet ring (7) is raised slightly and the deposit at the vessel wall is dried by centrifuging. After opening the ring (7) completely, the dried deposit is flung out through the gap between ring (7) and the vessel base (8).

10 Claims, 4 Drawing Sheets

PROCESS FOR THE FILTRATION AND DRYING OF SOLID PARTICLES OUT OF LIQUIDS

FIELD OF THE INVENTION

The invention presented concerns the filtration of liquids. In particular machines for grinding, electric arc erosion and other metal machining methods, in which the metal removal process must be cooled with oil or emulsion, are equipped with a coolant conditioning unit, the purpose of which is to clean the coolant leaving the working area of solid particles, e.g. metal and grinding wheel particles, in the following called deposit, and to subsequently re-channel it into the process. In processes involving high metal removal rates, up to 200 liters/min. are fed into the machine under high pressure. But also in other processes the task of separating solid particles from liquids with high efficiency, quality and availability is frequently encountered, which strives after a deposit as dry as possible and a long filter life.

In the field principally considered here, i.e. the filtering of coolants for chip-removing machine tools, the cleaning of the coolant from metal chips and other solid particles involved in the process is mostly effected with centrifuges or filtering plants using band or gap filters, or other types of filter element.

BACKGROUND OF THE INVENTION

The known centrifuges have the advantage of requiring no actual filter, and—thanks to the centrifugal action—permit a lower residual liquid content in the deposit than with the known true filter units. Due to the limitations on the control of the centrifuge size and speed under high purity requirements, however, their filtration rate is restricted to outputs which are inadequate for processes involving high liter flowrate.

The limitations of the known band filter units for high liter flowrate and filtering quality lie in their high space requirements, the controllability of liquids carrying solid particles of varying consistency and size with respect to filter clogging, and in the high residual liquid content, which—where the relevant demands are high—make a subsequent separate drying of the deposit necessary.

In the case of known filtering units with tube-shaped filter elements, a high liter flowrate can even be achieved in modest space conditions and under high purity demands, and the filter tubes have a long life duration. However, depending on the nature and consistency of the deposit, problems arise in the filter re-generation phase with respect to detachment of the deposit from the filter surface, and the discharge of the deposit from the pressure vessel. Moreover here too the deposit is too laden with residual liquid, and must be dried in an additional operation before being discarded.

SUMMARY OF THE INVENTION

The objective of the present invention therefore consists in introducing a process and an apparatus by which, under modest space requirements and at high liter flowrates, the liquid can be efficiently cleansed and the deposit dried. In accordance with the invention, the functions Filtration Regeneration of the filter and Drying of the deposit are fulfilled in a single apparatus, where the filtered liquid, the polluted residual liquid from the deposit, and the dried deposit leave the apparatus independent of each other by different discharge openings.

BRIEF DESCRIPTION OF THE DRAWINGS

Two embodiments of the invention are hereinafter described with reference to the drawings, in which.

DETAILED DESCRIPTION OF THE EMBODIMENTS

Figure 1:
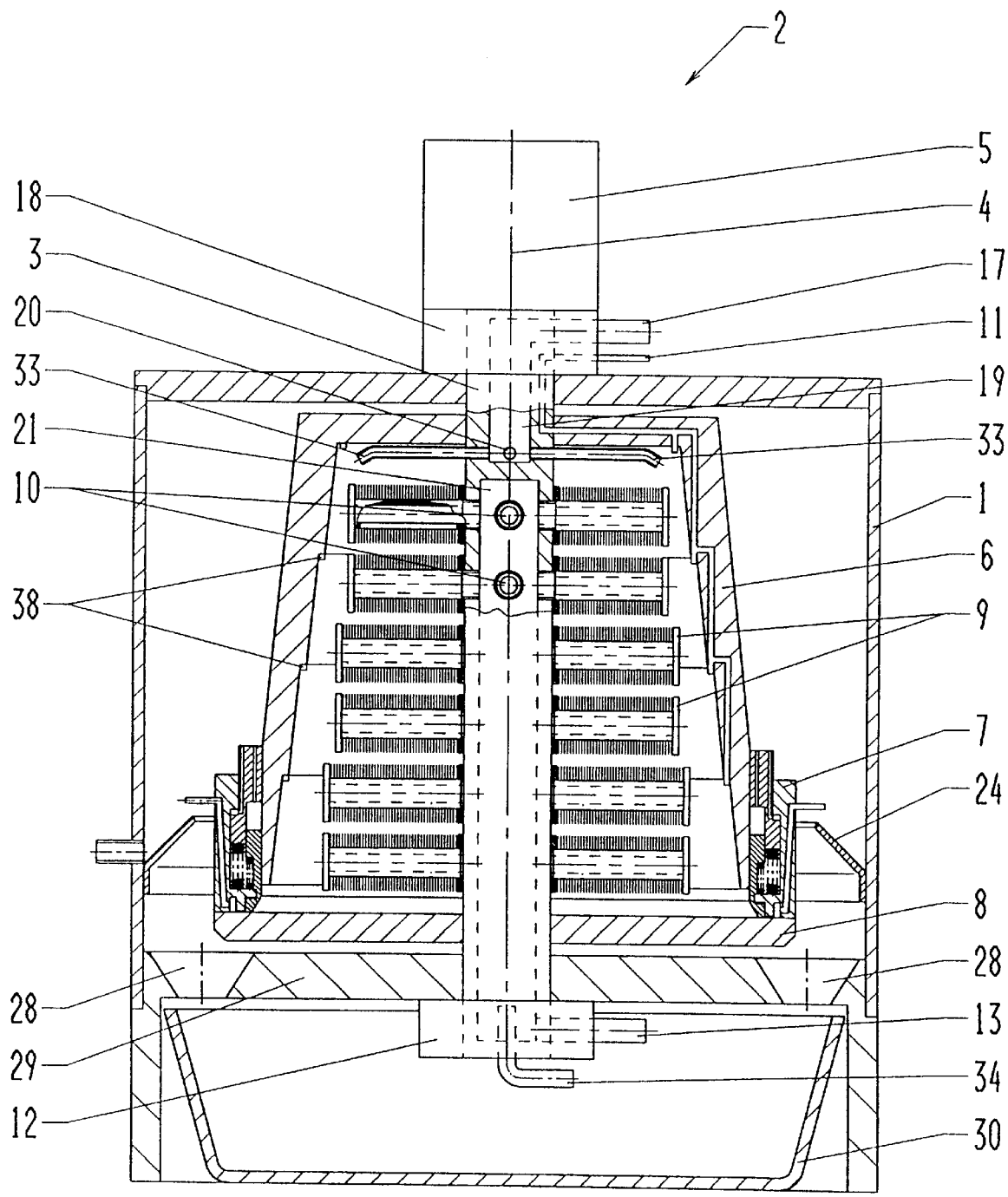
FIG. 1 shows a section through the filtering apparatus acc. to variant A.

In the housing 1 of the filtering apparatus 2 depicted diagrammatically in FIG. 1, the hollow shaft 3 is located for rotation about the axis 4, driven by the motor 5. Inside the housing 1 is the filter drum 6, conceived as pressure vessel, which is firmly connected to the hollow shaft 3. Between the outer wall of the filter drum 6 and its base 8 is the outlet ring 7 by which the filter drum 6 can be opened to discharge the deposit. Inside the filter drum 6, fitted in star formation in tiers to the hollow shaft 3, are the filter tubes 9, which are connected to the lower chamber 21 of the shaft 3 via holes 10 in the shaft wall.

Figure 2:
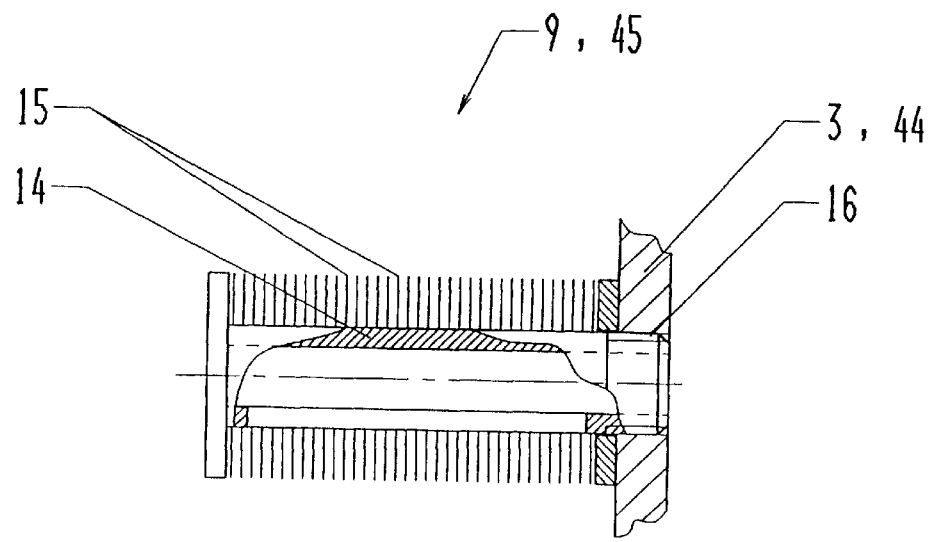
FIG. 2 shows the section through a filter element.

In the embodiment shown in FIG. 2, the filter tubes 9 comprise packs of paper discs 15 stacked and pressed together, and pushed onto tubes 14 slatted longitudinally or provided with holes. Instead of these gap filters, other types of tube-shaped back-flushing filter elements can be envisaged. The tubes 14 are closed at one end and provided with a thread at the other end for screwing them to the hollow shaft 3.

In the course of filtering, non-filtered liquid is pumped into the stationary, closed filter drum 6 via the hose 17, the inlet ring 18, the upper chamber 19, the wall holes 20 of the hollow shaft 3 and the tubes 33, and after passing through the filter tubes 9 and the lower chamber 21 of the shaft 3 leaves the filtering apparatus via the outlet ring 12 and the hose 13 as filtered liquid.

Figure 3:
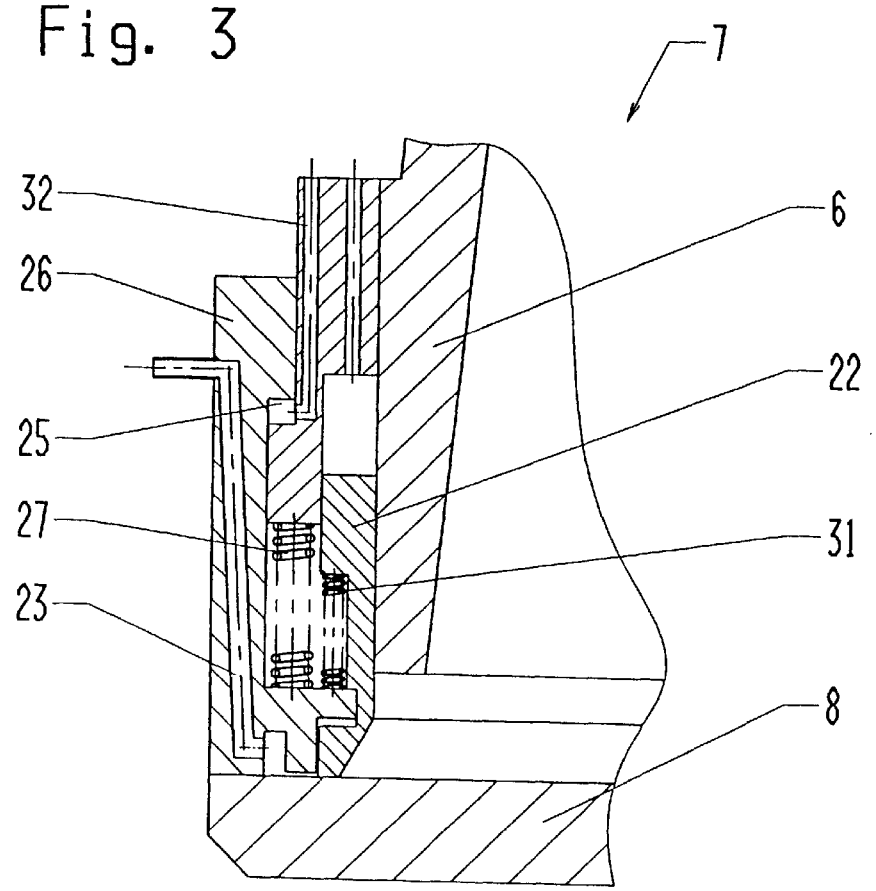
FIG. 3 shows a section through the outlet ring of variant A.

At periodic intervals the filtering process is interrupted in order to clean the filter tubes 9 and to dry and discharge the deposit. By way of compressed air fed into the filter drum 6 at the inlet connection 11, through the inlet ring 18 and the upper chamber 19 of the shaft 3, the liquid is forced through the filter tubes 9 out of the filter drum 6. After emptying the filter drum 6, the pneumatic annular piston 22 of the outlet ring 7 depicted in FIG. 3, which serves as a valve, is load relieved, so that it is lifted by the springs 31 a few hundredths of a millimeter above the base plate 8, and the filter drum 6 is set in rotation. Due to the resulting centrifugal force, deposit adhering to the filter tubes 9 is detached and by means of compressed air or clean oil issuing from the nozzles 38 or by liquid introduced via the holes 20 and tubes 33 propelled to the base 8 of the filter drum 6, where it is dried by centrifuging, the residual liquid in the filter drum 6 escaping from the filter drum 6 via the annular gap between the annular piston 22 and the drum base 8, and being fed back to the non-filtered liquid via the hole 23 and the catch tray 24. The re-generation of the filter is backed up by compressed air or clean oil fed via the inlet 34 into the lower chamber 21 of the hollow shaft 3, which flows through the filter tubes 9 from the inside to the outside.

After the drying of the deposit, pressure is applied to the annular piston 25 (FIG. 3) via the compressed air channel 32, lifting the sealing ring 26 complete with the annular piston 22 against the thrust of the springs 27, and thereby clearing the outlet opening for the dry deposit, which at the walls of the filter drum 6 falls through the opening 28 in the base plate 29 of the housing 1 into the deposit container 30.

Figure 4:
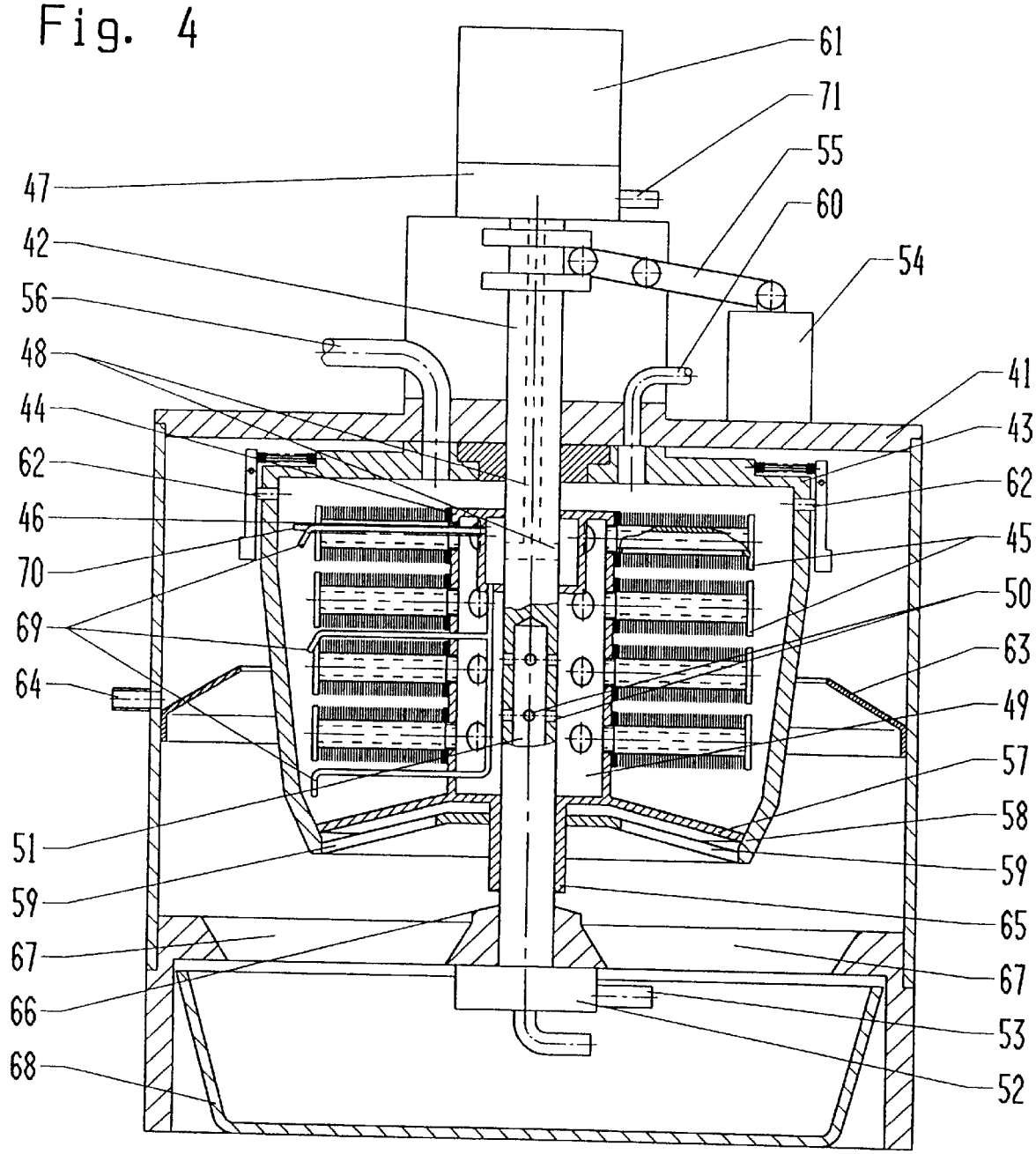
FIG. 4 shows a section through the filtering apparatus acc. to variant B, with the filter drum in topmost position.

The embodiment according to variant B of the filtering apparatus in FIG. 4 comprises a housing 41 containing a shaft 42 located for rotation and axial displacement, and a filter drum 43 firmly attached to the shaft. Inside the filter drum 43, located for axial displacement and rotation on the shaft 42 is the filter bearer 44 carrying on its outer periphery the filter tubes 45 arranged star-shaped and in tiers and screwed firmly to it, and the compressed air nozzles 69, 70, which are connected to the annular inner chamber 46, which for cleaning the filter drum 43 is supplied with compressed air via the pipe 71, the feed ring 47 and the holes 48 in the shaft 42. The outer annular chamber 49 of the filter bearer 44 is connected to the drain pipe 53 via the transverse holes 50, the axial bore 51 of the shaft 42 and the drainage ring 52.

To filter the liquid, the filter drum 43 is brought via the actuating cylinder 54 and the lever 55 to the uppermost position, in which it seals against the top shoulder of the housing 41, and is supplied via the feed pipe 56 with liquid to be filtered. In this position, the filter bearer 44 rests with its flange 57 on the inside cone 58 of the filter drum 43, closing the outlet openings 59 of the latter, so that the liquid can only leave the stationary filter drum 43 by way of the filter tubes 45, the filtrate remaining in the filter drum 43.

The cleaning of the filter and discarding of the deposit begins with the blocking of liquid feed and the forcing of the liquid out of the filter drum 43 by way of compressed air fed via the compressed air pipe 60 into the filter drum 43, by which action the liquid escapes via the flange 57 through the filter tubes, leaving a small residue. After the emptying of the filter drum 43, the latter is lowered about 1.5 mm via the actuating cylinder 54 and the lever 55, such that it no longer contacts the housing 41, and is set in rotation by way of the motor 61, whereby due to the centrifugal force the solid particles adhering to the filter tubes 45 is slung off, and the residual liquid leaves the filter drum 43 via the outlet holes 62 opened by the centrifugal force, and is fed to the non-filtered liquid by way of the channel 63 and the drain 64. Here too the regeneration of the filter is backed up by compressed air or clean oil from the annular chamber 49 pressed through the filter tubes 45 from the inside to the outside.

After slinging the deposit clear of the filter tubes 45 and the removal of the residual liquid from the filter drum 43, the latter is lowered by the actuating cylinder 54 and the lever 55 a few millimeters, such that the joint between the inner cone 58 of the filter drum 4S and the flange 57 of the filter bearer 44 is opened a little, and the filter bearer 44 rests with the taper seat of its lower shaft end 65 on the support cone 66 of the housing 41, the said cone 66 acting as coupling to support the filter bearer 44 and brake it against rotation. In this position, with the filter bearer 44 stationary, the filter drum 43 is brought to a higher speed of rotation, and the deposit inside is centrifuged till dry.

Figure 5:
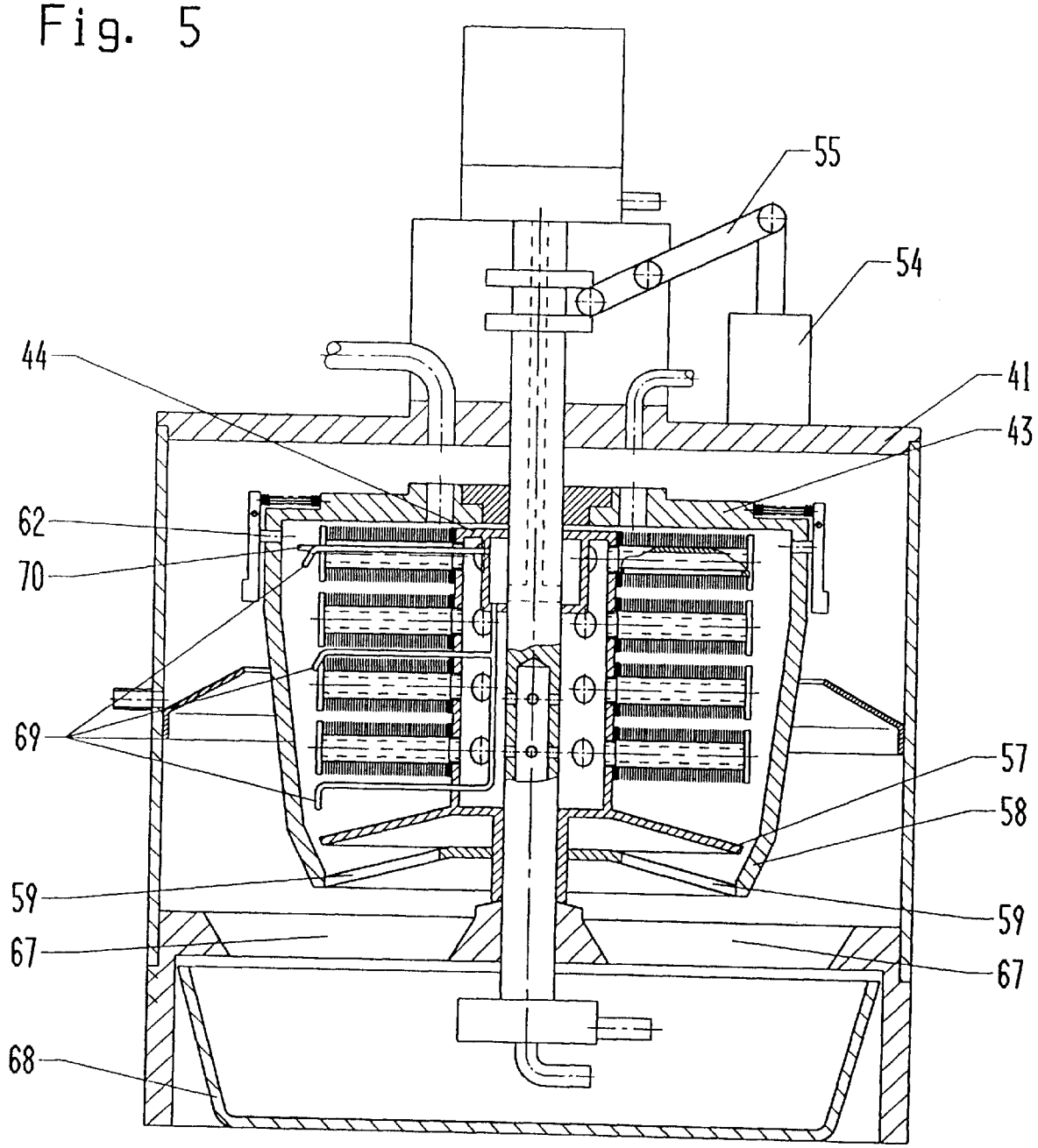
FIG. 5 shows a section through the filtering apparatus acc. to variant B, with the filter drum in lowermost position.

After the centrifuging of the deposit the filter drum 43 is brought by the actuating cylinder 54 and the lever 55 to the lowermost position as shown in FIG. 5, in which the clearance between the flange 57 of the filter bearer 44 and the inside cone 58 of the filter drum 43 is open to a maximum, and by means of compressed air emitted from the compressed air nozzles 69 as the filter drum 43 rotates slowly the dried deposit is detached from the walls of the latter and discharged through the openings 59 and 67 in the filter drum 43 and the housing 41 respectively and into the deposit container 68. The compressed air nozzle 70 serves to clean the outlet openings 62 of the filter drum 43 of any deposit residue.

What is claimed is:

1. Process for filtering liquids in which non-filtered liquids inside a pressure vessel is pressed in such a manner through a filter device with several filter tubes the filter tubes being connected via a drain pipe for filtered liquid, that a deposit remains in the vessel and adheres to said filter tubes, and is removed from it in periodic intervals, wherein the functions of filtering, cleaning of the filter device, and drying of the deposit are amalgamated in the same apparatus, wherein for cleaning and drying, the filtering is interrupted, and wherein during filtering, the vessel and the filter device are stationary, and wherein during cleaning of the filter device the deposit is detached by revolving the filter device, and the drying of the deposit takes place by rotating the vessel centrifuging the deposit.

2. Process in accordance with claim 1, wherein the deposit adhering to a wall of the vessel is detached by means of a pressure medium.

3. Process in accordance with claim 1, wherein while cleaning the filter tubes and while centrifuging the deposit the vessel is rotated at a first speed and a second different speed respectively wherein the first speed and second speed are different from each other.

4. Process in accordance with claim 1, wherein before the centrifuging of the deposit an outlet gap for residual liquid is opened by means of an actuating mechanism.

5. Process in accordance with claim 1, wherein during detaching the deposit off the filter tubes and the centrifuging of the deposit, outlet openings for a residual liquid are opened automatically by centrifugal force.

6. Process in accordance with claim 1, wherein said deposit is propelled to a base of the vessel, where it is dried by centrifuging.

7. Process in accordance with claim 1, wherein said centrifuging takes place with the filter device being stationary.

8. Process in accordance with claim 1, wherein during clearing the filter device is rotated at a first speed, wherein during drying the vessel is rotated at a second speed and wherein the second speed is greater than the first speed.

9. Process for filtering liquids in which non-filtered liquids inside a pressure vessel is pressed in such a manner through a filter device with several filter tubes the filter tubes being connected via a drain pipe for filtered liquid, that a deposit remains in the vessel and adheres to said filter tubes, and is removed from it in periodic intervals, wherein the functions of filtering, cleaning of the filter device, and drying of the deposit are amalgamated in the same apparatus, wherein for cleaning and drying, the filtering is interrupted, and wherein during filtering, the vessel and the filter device are stationary, wherein during cleaning of the filter device the deposit is detached by revolving the filter device, and the drying of the deposit takes place by rotating the vessel centrifuging the deposit; and wherein during clearing the filter device is rotated at a first speed, wherein during drying the vessel is rotated at a second speed and wherein the second speed is greater than the first speed.

10. Process for filtering liquids in which non-filtered liquids inside a pressure vessel is pressed in such a manner through a filter device with several filter tubes the filter tubes being connected via a drain pipe for filtered liquid, that a deposit remains in the vessel and adheres to said filter tubes, and is removed from it in periodic intervals, wherein the functions of filtering, cleaning of the filter device, and drying of the deposit are amalgamated in the same apparatus, wherein for cleaning and drying, the filtering is interrupted, wherein during filtering, the vessel and the filter device are stationary, and wherein during cleaning of the filter device the deposit is detached by revolving the filter device, and the drying of the deposit takes place by rotating the vessel centrifuging the deposit; and wherein while cleaning the filter tubes and while centrifuging the deposit the vessel is rotated at a first speed and a second different speed respectively wherein the first speed and second speed are different from each other.

* * * * *